(12) United States Patent
Fadell et al.

(10) Patent No.: US 7,940,026 B2
(45) Date of Patent: May 10, 2011

(54) METHODS AND APPARATUS FOR CHARGING A BATTERY IN A PERIPHERAL DEVICE

(75) Inventors: Anthony M. Fadell, Portola Valley, CA (US); Christoph Krah, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/634,601

(22) Filed: Dec. 9, 2009

(65) Prior Publication Data

US 2010/0085011 A1    Apr. 8, 2010

Related U.S. Application Data

(63) Continuation of application No. 11/270,901, filed on Nov. 10, 2005, now Pat. No. 7,656,623, which is a continuation of application No. 10/278,752, filed on Oct. 22, 2002, now Pat. No. 6,995,963.

(60) Provisional application No. 60/345,253, filed on Oct. 22, 2001.

(51) Int. Cl.
*H02J 7/00* (2006.01)
*H02H 7/00* (2006.01)
*G06F 1/00* (2006.01)

(52) U.S. Cl. .......................... 320/128; 361/18; 713/300

(58) Field of Classification Search .................. 320/128; 361/18
See application file for complete search history.

(56) References Cited

U.S. PATENT DOCUMENTS

| 1,419,828 A | 6/1922 | Dornier |
|---|---|---|
| 4,257,098 A | 3/1981 | Lacy |
| 4,673,861 A | 6/1987 | Dubovsky et al. |
| 4,965,738 A | 10/1990 | Bauer et al. |
| 5,019,717 A | 5/1991 | McCurry et al. |
| 5,103,156 A | 4/1992 | Jones et al. |
| 5,150,031 A | 9/1992 | James et al. |
| 5,200,685 A | 4/1993 | Sakamoto |
| 5,206,538 A | 4/1993 | Orta |

(Continued)

FOREIGN PATENT DOCUMENTS

EP        1 333 356        8/2003

(Continued)

OTHER PUBLICATIONS

Notice of Allowance dated Nov. 19, 2009 in U.S. Appl. No. 11/270,901.

(Continued)

*Primary Examiner* — Edward Tso
*Assistant Examiner* — M'Baye Diao
(74) *Attorney, Agent, or Firm* — Beyer Law Group LLP

(57) ABSTRACT

A power manager for managing power delivered to a battery operated peripheral device is disclosed. The power manager includes an input current limiter arranged to suppress a power surge associated with an insertion event by a power cable arranged to provide an external voltage. A voltage converter unit coupled to the input current limiter converts the received external voltage to a supply voltage that is transmitted by way of a main bus to a voltage sensor unit coupled thereto. During the insertion event, a comparator unit coupled to the voltage sensor, sends a first switching signal to a switchover circuit that responds by connecting the peripheral device and an uncharged battery to the main bus such that the supply voltage is provided thereto. When the battery is substantially fully charged, the switchover circuit responds by electrically disconnecting the battery so as to not overcharge the battery.

18 Claims, 11 Drawing Sheets

U.S. PATENT DOCUMENTS

| | | | |
|---|---|---|---|
| 5,252,891 | A | 10/1993 | Huang |
| 5,304,916 | A | 4/1994 | Le et al. |
| 5,307,002 | A | 4/1994 | Ho et al. |
| 5,349,281 | A | 9/1994 | Bugaj |
| 5,371,456 | A | 12/1994 | Brainard |
| 5,396,163 | A | 3/1995 | Nor et al. |
| 5,402,055 | A | 3/1995 | Nguyen |
| 5,471,128 | A | 11/1995 | Patino et al. |
| 5,498,950 | A | 3/1996 | Ouwerkerk |
| 5,514,945 | A | 5/1996 | Jones |
| 5,539,298 | A | 7/1996 | Perkins et al. |
| 5,579,489 | A | 11/1996 | Dornier et al. |
| 5,602,455 | A | 2/1997 | Stephens et al. |
| 5,648,712 | A | 7/1997 | Hahn |
| 5,675,813 | A | 10/1997 | Holmdahl |
| 5,752,046 | A | 5/1998 | Oprescu et al. |
| 5,754,027 | A | 5/1998 | Oglesbee et al. |
| 5,805,433 | A | 9/1998 | Wood |
| 5,808,446 | A | 9/1998 | Eguchi |
| 5,845,217 | A | 12/1998 | Lindell et al. |
| 5,955,867 | A | 9/1999 | Cummings et al. |
| 5,955,869 | A | 9/1999 | Rathmann |
| 5,964,879 | A | 10/1999 | Dunstan et al. |
| 5,982,141 | A | 11/1999 | Hinohara |
| 6,007,372 | A | 12/1999 | Wood |
| 6,025,695 | A | 2/2000 | Friel et al. |
| 6,087,804 | A | 7/2000 | Suda |
| 6,125,455 | A | 9/2000 | Yeo |
| 6,130,518 | A | 10/2000 | Gabehart et al. |
| 6,151,652 | A * | 11/2000 | Kondo et al. ............... 713/300 |
| 6,152,778 | A | 11/2000 | Dalton |
| 6,167,289 | A | 12/2000 | Ball et al. |
| 6,169,387 | B1 | 1/2001 | Kaib |
| 6,178,514 | B1 | 1/2001 | Wood |
| 6,184,652 | B1 | 2/2001 | Yang |
| 6,184,655 | B1 | 2/2001 | Malackowski |
| 6,195,754 | B1 | 2/2001 | Jardine et al. |
| 6,204,637 | B1 | 3/2001 | Rengan |
| 6,211,581 | B1 | 4/2001 | Farrant |
| 6,211,649 | B1 | 4/2001 | Matsuda |
| 6,218,812 | B1 | 4/2001 | Hanson |
| 6,252,380 | B1 | 6/2001 | Koenck |
| 6,261,109 | B1 | 7/2001 | Liu et al. |
| 6,271,605 | B1 | 8/2001 | Carkner et al. |
| 6,283,789 | B1 | 9/2001 | Tsai |
| 6,316,916 | B2 | 11/2001 | Bohne |
| 6,329,796 | B1 | 12/2001 | Popescu |
| 6,348,776 | B2 * | 2/2002 | Kim ............................ 320/110 |
| 6,353,894 | B1 | 3/2002 | Pione |
| 6,357,011 | B2 | 3/2002 | Gilbert |
| 6,362,610 | B1 | 3/2002 | Yang |
| 6,363,491 | B1 | 3/2002 | Endo |
| 6,392,414 | B2 | 5/2002 | Bertness |
| 6,448,863 | B1 | 9/2002 | Ogawa et al. |
| 6,465,909 | B1 | 10/2002 | Soo et al. |
| 6,487,442 | B1 | 11/2002 | Wood |
| 6,489,751 | B2 | 12/2002 | Small et al. |
| 6,526,516 | B1 | 2/2003 | Ishikawa et al. |
| 6,531,845 | B2 | 3/2003 | Kerai et al. |
| 6,571,343 | B1 | 5/2003 | Johnson et al. |
| 6,580,460 | B1 * | 6/2003 | Takahashi et al. ............ 348/372 |
| 6,614,232 | B1 | 9/2003 | Mukai |
| 6,633,932 | B1 | 10/2003 | Bork et al. |
| 6,731,751 | B1 | 5/2004 | Papadopoulos |
| 6,747,859 | B2 | 6/2004 | Walbeck et al. |
| 6,774,604 | B2 | 8/2004 | Matsuda et al. |
| 6,799,226 | B1 | 9/2004 | Robbin et al. |
| 6,820,206 | B1 | 11/2004 | Kim et al. |
| 6,917,504 | B2 | 7/2005 | Nguyen et al. |
| 6,936,936 | B2 | 8/2005 | Fischer et al. |
| 6,946,816 | B2 | 9/2005 | Pfab et al. |
| 6,969,970 | B2 | 11/2005 | Dias et al. |
| 6,993,615 | B2 | 1/2006 | Falcon |
| 6,995,963 | B2 | 2/2006 | Fadell et al. |
| 7,016,595 | B1 | 3/2006 | Ishino et al. |
| 7,160,113 | B2 | 1/2007 | McConnell et al. |
| 7,197,650 | B2 | 3/2007 | Watanabe et al. |
| 2001/0003205 | A1 | 6/2001 | Gilbert |
| 2001/0005641 | A1 | 6/2001 | Matsumoto et al. |
| 2001/0006884 | A1 | 7/2001 | Matsumoto |
| 2002/0070705 | A1 | 6/2002 | Buchanan et al. |
| 2002/0156949 | A1 | 10/2002 | Kubo et al. |
| 2003/0110403 | A1 | 6/2003 | Crutchfield et al. |
| 2004/0162029 | A1 | 8/2004 | Grady |
| 2004/0224638 | A1 | 11/2004 | Fadell et al. |
| 2004/0225804 | A1 | 11/2004 | Leete |
| 2006/0039263 | A1 | 2/2006 | Trotabas |
| 2006/0125446 | A1 | 6/2006 | Tupman et al. |
| 2006/0212637 | A1 | 9/2006 | Lo et al. |
| 2007/0108788 | A1 | 5/2007 | Shalam et al. |
| 2007/0247794 | A1 | 10/2007 | Jaffe et al. |

FOREIGN PATENT DOCUMENTS

| | | |
|---|---|---|
| JP | 2001-69165 A | 3/2001 |
| WO | WO 99/26330 | 5/1999 |
| WO | WO 00/39907 | 7/2000 |
| WO | WO 03/073688 | 9/2003 |
| WO | WO 2006/073702 | 7/2006 |

OTHER PUBLICATIONS

Office Action dated Oct. 29, 2009 in U.S. Appl. No. 11/754,932.
Office Action dated Oct. 23, 2009 in U.S. Appl. No. 11/364,414.
Office Action dated Jul. 22, 2009 in U.S. Appl. No. 11/364,414.
Office Action dated Mar. 18, 2009 in U.S. Appl. No. 11/364,414.
Office Action dated Aug. 7, 2008 in U.S. Appl. No. 11/364,414.
Office Action dated Jul. 30, 2009 in U.S. Appl. No. 11/754,932.
LTC1735-1, High Efficiency Step-Down Switching Regulator, Linear Technology Corporation, pp. 1-28.
LTC1731-4, Single Cell Lithium-Ion Linear Battery Charger Controller, Linear Technology Corporation, pp. 1-9.
Office Action dated Jun. 2, 2009 in U.S. Appl. No. 11/270,901.
Office Action dated May 15, 2009 in U.S. Appl. No. 11/754,932.
Office Action dated Nov. 14, 2008 in U.S. Appl. No. 11/270,901.
Office Action dated Jan. 13, 2009 in U.S. Appl. No. 11/754,932.
Office Action dated Oct. 15, 2008 in U.S. Appl. No. 11/754,932.
Office Action dated Dec. 12, 2008 in EP Application No. 07 751.563. 3.
Office Action dated May 5, 2008 in U.S. Appl. No. 11/754,932.
Office Action dated May 2, 2008 in U.S. Appl. No. 11/270,901.
Office Action in U.S. Appl. No. 11/270,901 dated Nov. 27, 2007.
"The Authoritative Dictionary of IEEE Standard Terms", 200, IEEE Press, 7$^{th}$ edition, pp. 1215.
International Search Report dated Feb. 18, 2008 for corresponding PCT Application No. PCT/US2007/004811.
Written Opinion dated Feb. 18, 2008 for corresponding PCT Application No. PCT/US2007/004811.
"A Serial Bus on Speed Diagram: Getting Connected with FireWire", downloaded Oct. 16, 2001, PC Magazine: PC Tech (A Serial Bus on Speed), wysiwyg://51/http://www.zdnet.com/pctech/content/18/10/tu1810.007.html.
"Cables to Go", download Oct. 16, 2001, http://www.cablestogo.com/product.asp?cat%5Fid=601&sku=27028.
"ExpressBus™ FU010 User Guide Packing Checklist", Belkin Components.
"FireWire Connector", downloaded Oct. 16, 2001, wysiwyg://76/http://developer.apple.com/...es/Macintosh_CPUs-G3/ibook/ibook-27.html.
"FireWire", downloaded Oct. 16, 2001, wysiwyg://42/http://developer.apple.com/hardware/FireWire.
"How to Connect Your Computer, PC Hardware", downloaded Oct. 16, 2001, http://www.scar.utoronto.ca/~ccweb/faculty/connect-howto.html.
"IEEE 1394/USB Comparison", downloaded Oct. 16, 2001, www.genitech.com.au/LIBRARY/TechSupport/infobits/firewire_vs_usb.htm.
"Making USB Work", downloaded Oct. 16, 2001, PC Magazine: PC Tech (Making USB Work) wysiwyg://55/http://www.zdnet.com/pcmag/pctech/content/18/04/tu1804.001.html.
"PMC FW2 IEEE1394 FireWire Controller", downloaded Oct. 16, 2001, http://www.bvmltd.co.uk/PMCfw2ds.html.
"Why FireWire is Hot!Hot!Hot!", downloaded Oct. 16, 2001, "Impact.FireWire.SideBar", http://www.vxm.com/21R.35.html.

Ian Fried, "FireWire poised to become ubiquitous", downloaded Oct. 16, 2001, CNET News.com, 1394 Trade Association: Press, wysiwyg://32/http://1394ta.org/Press/2001Press/august/8.27.b.html.

Ian Fried, "New FireWire to blaze faster trail", downloaded Oct. 16, 2001, CNET News.com, http://news.cnet.com/news/0-1006-200-6021210.html.

Michael D. Johas Teener, "Understanding FireWire: The IEEE 1394 Standards and Specifications", downloaded Oct. 16, 2001, wysiwyg://9/http://www.chipcenter.com/networking/ieee1394/main.html.

International Search Report in PCT application PCT/US05/024906 dated Mar. 15, 2006.

Full English Translation of Japanese Kokai Patent Application #2001-69165A, Takeshi Koura.

"Introduction to Public Key Cryptography," Oct. 9, 1998, printed from http://developer.netscape.com/docs/manuals/security/pkin/contents.htm on Oct. 6, 2004.

Brentrup, "Public Key Cryptography Demystified," Campus Technology, printed from http://www.campus-technology.com/article.asp?id=7626 on Oct. 6, 2004.

Whittle, "Public Key Authentication Framework: Tutorial," First Principles Consulting, Jun. 2, 1996.

Belkin iPod Voice Recorder, Product Specification Sheet, printed Jun. 16, 2004.

International Search Report and Written Opinion dated May 15, 2006 for corresponding PCT Application No. PCT/US2005/045040.

Menezes et al., "Handbook of Applied Cryptography," Identification and Entity Authentication, pp. 385-424.

"Firewire Finally Comes Home," Charles Severance, Computer, Nov. 1998, pp. 117-118.

International Search Report in PCT application PCT/US02/33856 dated Mar. 14, 2003.

\* cited by examiner

METHODS AND APPARATUS FOR CHARGING A BATTERY IN A PERIPHERAL DEVICE

CROSS REFERENCE TO RELATED APPLICATIONS

This application is a continuation of U.S. patent application Ser. No. 11/270,901, entitled "METHODS AND APPARATUS FOR CHARGING A BATTERY IN A PERIPHERAL DEVICE," filed Nov. 10, 2005, which is a continuation of U.S. patent application Ser. No. 10/278,752, entitled "METHODS AND APPARATUS FOR CHARGING A BATTERY IN A PERIPHERAL DEVICE," filed Oct. 22, 2002, now U.S. Pat. No. 6,995,963, issued on Feb. 7, 2006, which claims the benefit of priority under 35 U.S.C. §119(e).to U.S. Provisional Patent Application No. 60/345,253, entitled "METHODS AND APPARATUS FOR CHARGING A BATTERY IN A PERIPHERAL DEVICE VIA A FIREWIRE CABLE," filed on Oct. 22, 2001, all of which are incorporated herein by reference.

BACKGROUND OF THE INVENTION

1. Field of Invention

This invention relates generally to computing systems. Specifically, a method and apparatus for managing power delivered by way of a FireWire cable to a battery operated peripheral device.

2. Description of Related Art

FireWire is an IEEE1394 compliant High Performance Serial Bus that provides two types of data transfer: asynchronous and isochronous. Asynchronous is for traditional load-and-store applications where data transfer can be initiated and an application interrupted as a given length of data arrives in a buffer. Isochronous data transfer ensures that data flows at a pre-set rate so that an application can handle it in a timed way while providing the bandwidth needed for audio, imaging, video, and other streaming data. Isochronous service means it guarantees latency or the length of time between a requested action and when the resulting action occurs which is a critical feature in supporting real time video, for example. FireWire provides a high-speed serial bus with data transfer rates of 100, 200, or 400 Mbps as well as a single plug-and-socket connection on which up to 63 devices can be attached with data transfer speeds up to 400 Mbps (megabits per second). In this way, FireWire offers a standard, simple connection to all types of consumer electronics, including digital audio devices, digital VCRs and digital video cameras; as well as to traditional computer peripherals such as optical drives and hard disk drives.

The standard FireWire cable consists of six wires in which data is sent via two separately-shielded twisted pair transmission lines that are crossed in each cable assembly to create a transmit-receive connection. Two more wires carry power (8 to 28 v, 1.5 A max.) to remote devices. In some cases, such as with DV camcorders manufactured by the Sony Corporation of Japan, a 4 conductor FireWire cable is used (configured as the 6 wire cable but without the power wires) that terminate in smaller, 4 prong connectors. To connect a four prong device, such as the Sony DV camcorder with a standard IEE1394 FireWire device or interface card, an adapter cable is required having 4 prongs on one side and 6 on the other. In this way, the data lines are connected while omitting the power connection.

In those situations, however, when a battery operated six prong peripheral device is coupled to a FireWire cable, it is important for the power delivered to the device (typically 1.8 v, 3.3, or 5.0 v) to be both stable and reliable especially when the FireWire cable is either connected or disconnected.

Therefore, what is required is a method and apparatus for managing power delivered by way of a FireWire cable to a battery operated peripheral device.

SUMMARY OF THE INVENTION

According to the present invention, methods, apparatus, and systems are disclosed for providing a cascadable state machine for broadcast content is disclosed.

In one embodiment, a power manager for managing power delivered to a battery operated peripheral device is disclosed. The power manager includes an input current limiter arranged to suppress a power surge associated with an insertion event by a power cable arranged to provide an external voltage. A voltage converter unit coupled to the input current limiter converts the received external voltage to a supply voltage that is transmitted by way of a main bus to a voltage sensor unit coupled thereto. During the insertion event, a comparator unit coupled to the voltage sensor, sends a first switching signal to a switchover circuit that responds by connecting the peripheral device and an uncharged battery to the main bus such that the supply voltage is provided thereto. When the battery is substantially fully charged, the switchover circuit responds by electrically disconnecting the battery so as to not overcharge the battery. During a cable removal event, the comparator unit sends a second signal to the switchover circuit which responds by substantially simultaneously disconnecting the main bus from the peripheral device and connecting the battery to the peripheral device.

In another embodiment, a method for managing power delivered to a battery operated peripheral device is disclosed. Suppressing a power surge associated with an insertion event by a power cable arranged to provide an external voltage. Converting the received external voltage to a supply voltage and sending the converted voltage by way of a main bus to a voltage sensor unit coupled thereto. During the insertion event, sending a first switching signal to a switchover circuit that responds by connecting the peripheral device and an uncharged battery to the main bus. Wherein when the battery is substantially fully charged, the switchover circuit responds by electrically isolating the battery from the powered cable. During a cable removal event, sending a second signal to the switchover circuit which responds by substantially simultaneously disconnecting the main bus from the peripheral device and connecting the battery to the peripheral device.

In still another embodiment, an apparatus for managing power to a battery-operated peripheral device is described. The apparatus includes means for receiving an external voltage from an external voltage supply by way of a cable, wherein the cable includes a number of lines some of which are data lines arranged to form a transmit-receive connection and some of which are power lines arranged to carry the external voltage from the external power supply to the device means for converting a received external voltage to a supply voltage, means for sensing a voltage, means for generating a switching signal based upon the sensed voltage, means for receiving the switching signal by a switchover circuit, and means for connecting the peripheral device and an uncharged battery to the supply voltage in response to the received switching signal.

BRIEF DESCRIPTION OF THE DRAWINGS

The invention will be better understood by reference to the following description taken in conjunction with the accompanying drawings.

DETAILED DESCRIPTION OF SELECTED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

In a battery powered FireWire compatible device, a method and apparatus for supplying power to the device that can be used to either operate the device of charge the device's battery are described. In one embodiment, various power signals on a FireWire data bus coupled to the device, provide for operating the device and/or charging the device's internal battery over a prescribed range of supply voltages. In a particular embodiment, the apparatus includes a built in surge suppression unit as well as a FireWire power/battery switchover unit to ensure that a stable and reliable power supply is provided the device. In this way, additional power connectors are substantially eliminated thereby saving product cost and reducing product size.

The invention will now be described in terms a FireWire peripheral power management unit suitable for supplying power to any FireWire compatible device. Such devices include, for example, personal digital assistants, personal MP3 player/recorders, and the like.

Figure 1A:
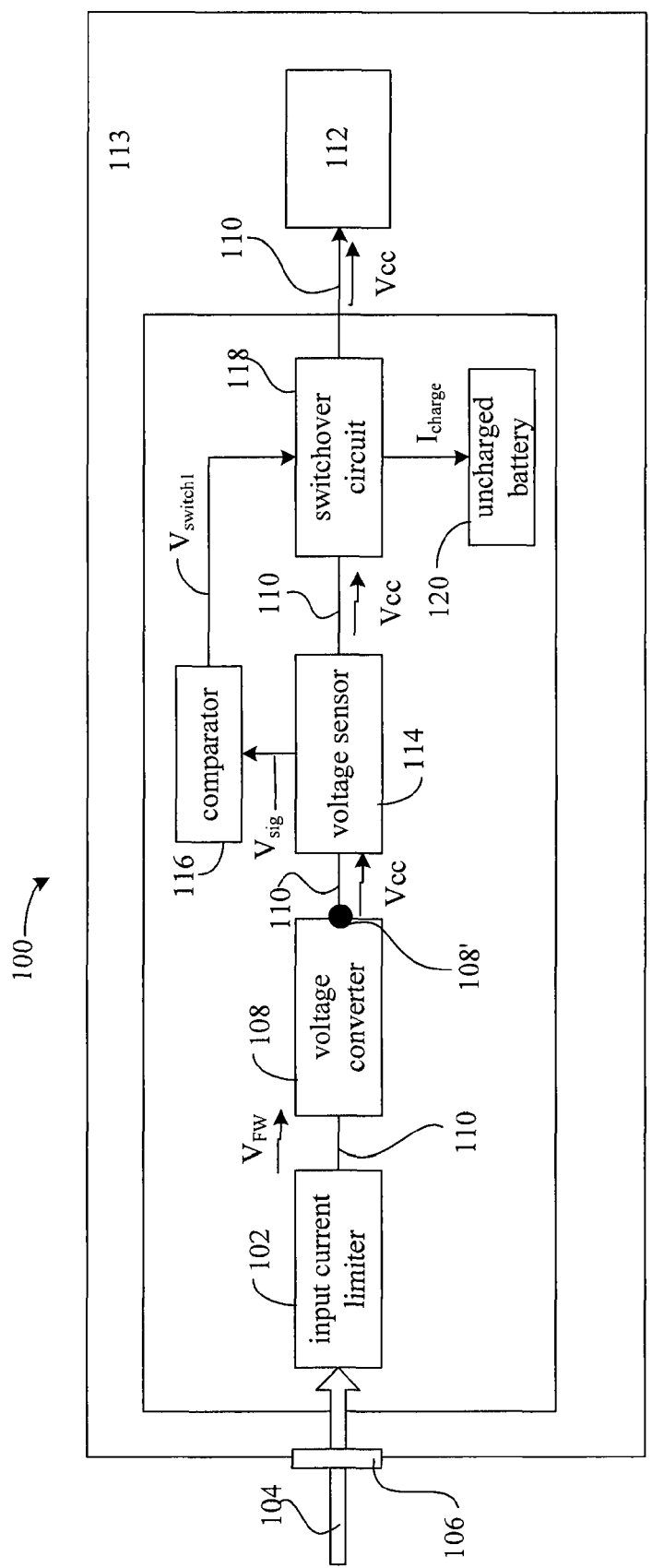
FIG. 1A shows a power manager unit with a fully discharged battery coupled to an active FireWire cable in accordance with an embodiment of the invention.

Accordingly, FIG. 1A shows a power manager unit 100 with a fully discharged battery coupled to an active FireWire cable in accordance with an embodiment of the invention. The power manager unit 100 includes an input current limiter (also known as an inrush current limiter) 102 for suppressing a power surge caused by a FireWire cable insertion event related to voltage transients (i.e., ground bounce) associated with an insertion of a powered FireWire cable 104 to an input port 106. It should be noted, that this phenomenon is only applicable to those peripheral devices capable of receiving a FireWire cable having a power wire included therein (such as a six prong type FireWire cable). The input current limiter 102 is, in turn, coupled to a voltage converter unit 108 having an output 108' arranged to convert a received external voltage Vext (in the form of a FireWire voltage VFW having a range of between 8 volts and 28 volts provided by the FireWire cable 104) to a supply voltage Vcc provided to a main bus 110. Typically, the supply voltage Vcc can be approximately 1.8 volts, approximately 3.3 volts, or approximately 5.0 volts each of which is suitable for driving an active circuit 112 included in a battery operated peripheral device 113.

Without the inrush current limiter, the rise time of fire wire power is slower because fire wire power is loaded with the bulk capacitance of the fire wire buck converter. The rise time of fire wire power is: 30V/20 us=1.5V/us.

A voltage is injected into the ground plane that elevates all supply rails by close to a volt. This voltage gradient can destroy components and cause reset due to undershoot. A 3.3V buck converter (is current limited (0.75A max) and can not overcome the inrush current and therefore can not compensate for the voltage gradient on the 3.3V supply rail.

With the inrush current limiter installed the rise time of fire wire power is much steeper because the inrush current is limited to well below 1 amp.

Figure 1B:
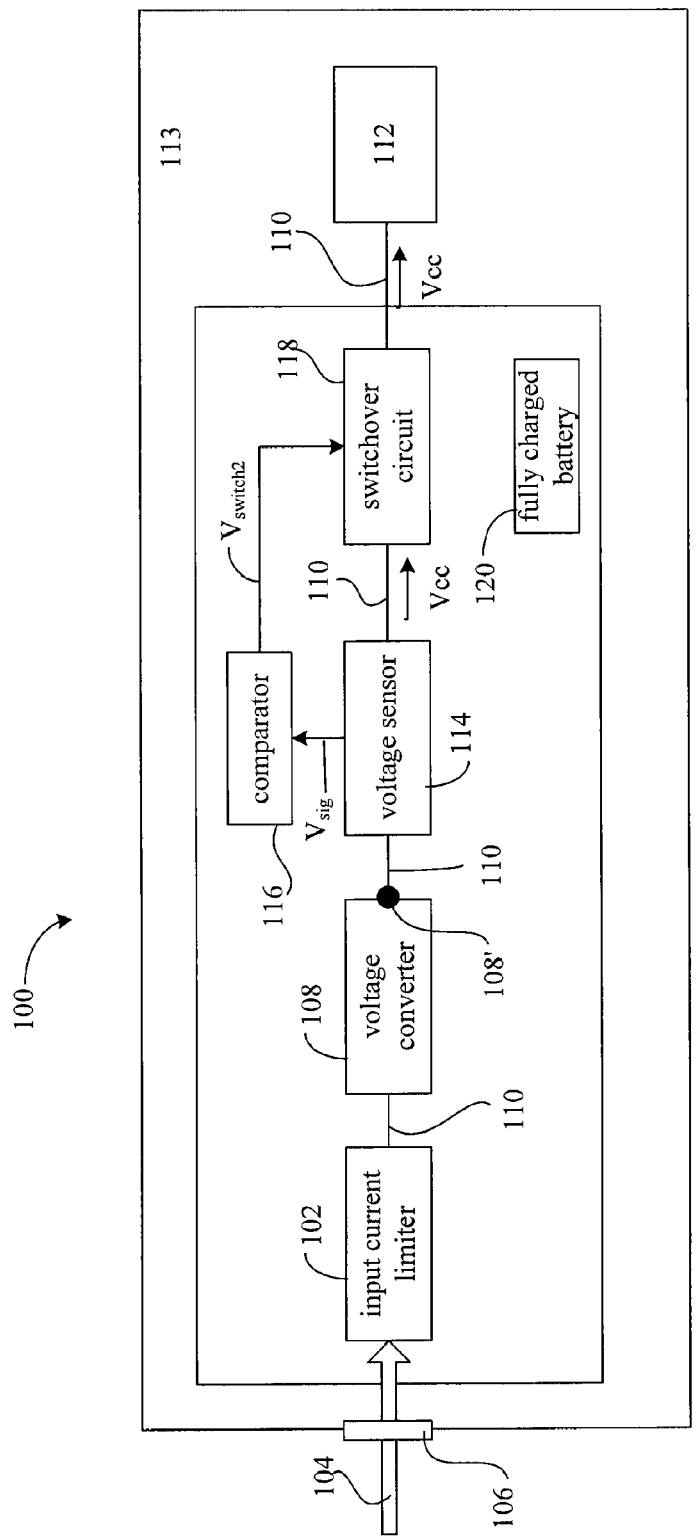
FIG. 1B shows the power manager unit of FIG. 1A where the battery is fully charged in accordance with an embodiment of the invention.

In the described embodiment, the voltage converter unit 108 is coupled to a voltage sensor 114 arranged to provide a voltage signal Vsig to a comparator unit 116. The comparator unit 116, based upon the voltage signal Vsig, provides a switchover signal Vswitch to a switchover circuit 118. In those cases where the voltage signal Vsig is above a voltage threshold Vth (indicative of a FireWire insertion event having had occurred at the input port 106), the comparator unit 116 provides a first switchover signal Vswitch1 to the switchover circuit 118. The switchover circuit 118, in turn, responds to the first switchover signal Vswitch1 by connecting the main bus 110 to the active circuit 112 (and thereby the supply voltage Vcc) and to a battery 120 when the battery 120 is substantially uncharged so as to provide a charging current to the battery 120. As shown in FIG. 1B, in those cases where the battery 120 is substantially fully charged, the comparator circuit 116 sends a second switchover signal Vswitch2 that causes the switchover circuit 118 to disconnect the battery 120 from the main bus 110 so as to avoid overcharging the battery 120.

The important feature of the fire wire buck converter is its soft start capability, meaning that the output voltage/current limit is slowly increased until it reaches its maximum. The soft start cap C131 is charged via internal current source. Without the external pull up resistor R48, the output voltage of the buck converter is going to change about 1.2 s/uF. With the additional pull up resistor and the soft start cap being 0.1 uF, the output voltage rise time is going to be much smaller, <15 ms.

Figure 1C:
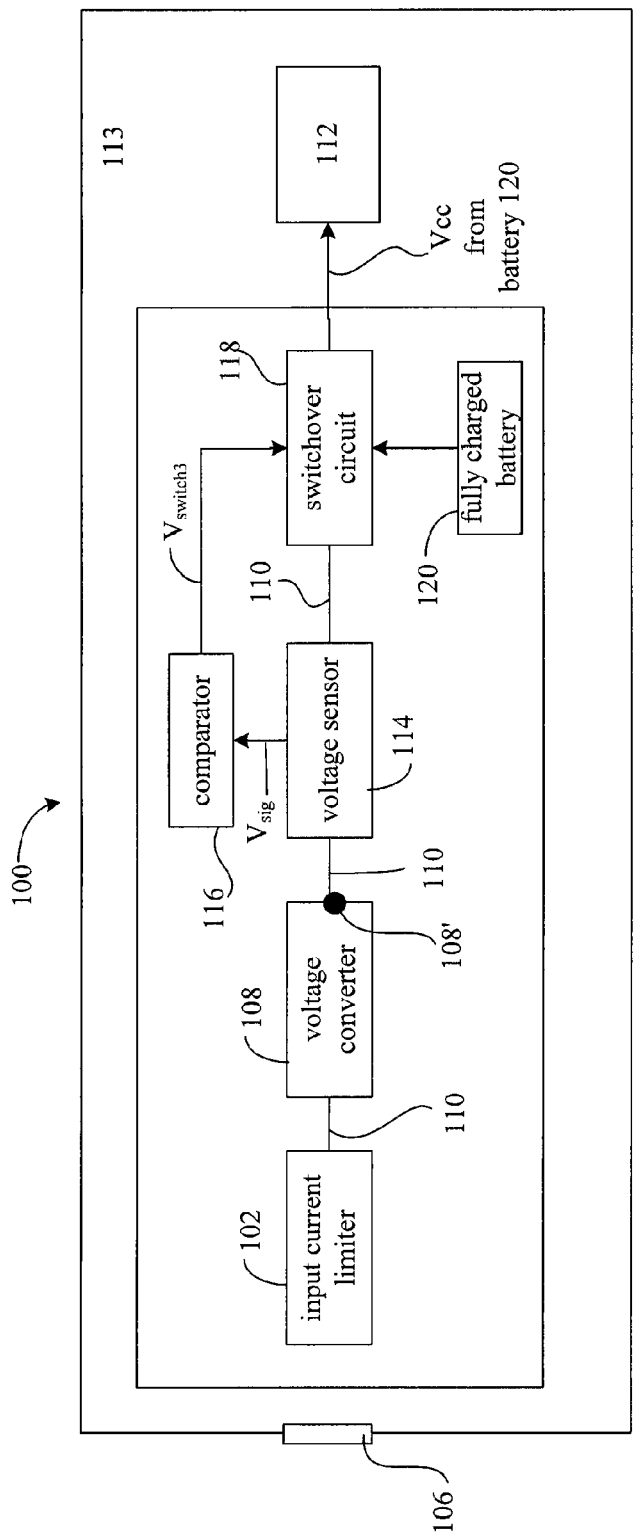
FIG. 1C shows the power manager unit of FIG. 1B where the FireWire cable of the invention.

In those situations shown in FIG. 1C where the powered FireWire cable 104 has been disconnected from the port 106, the voltage signal Vsig is below the voltage threshold Vth to which the comparator circuit 116 responds by providing a third switchover signal Vswitch3 to the switchover circuit 118. The switchover circuit 118 responds to the third switchover signal Vswitch3 by disconnecting the main bus 110 from the active circuit 112 and connecting the battery 120 in such a manner as to provide a substantially uninterrupted supply voltage Vcc to the active circuit 112.

Figure 2:
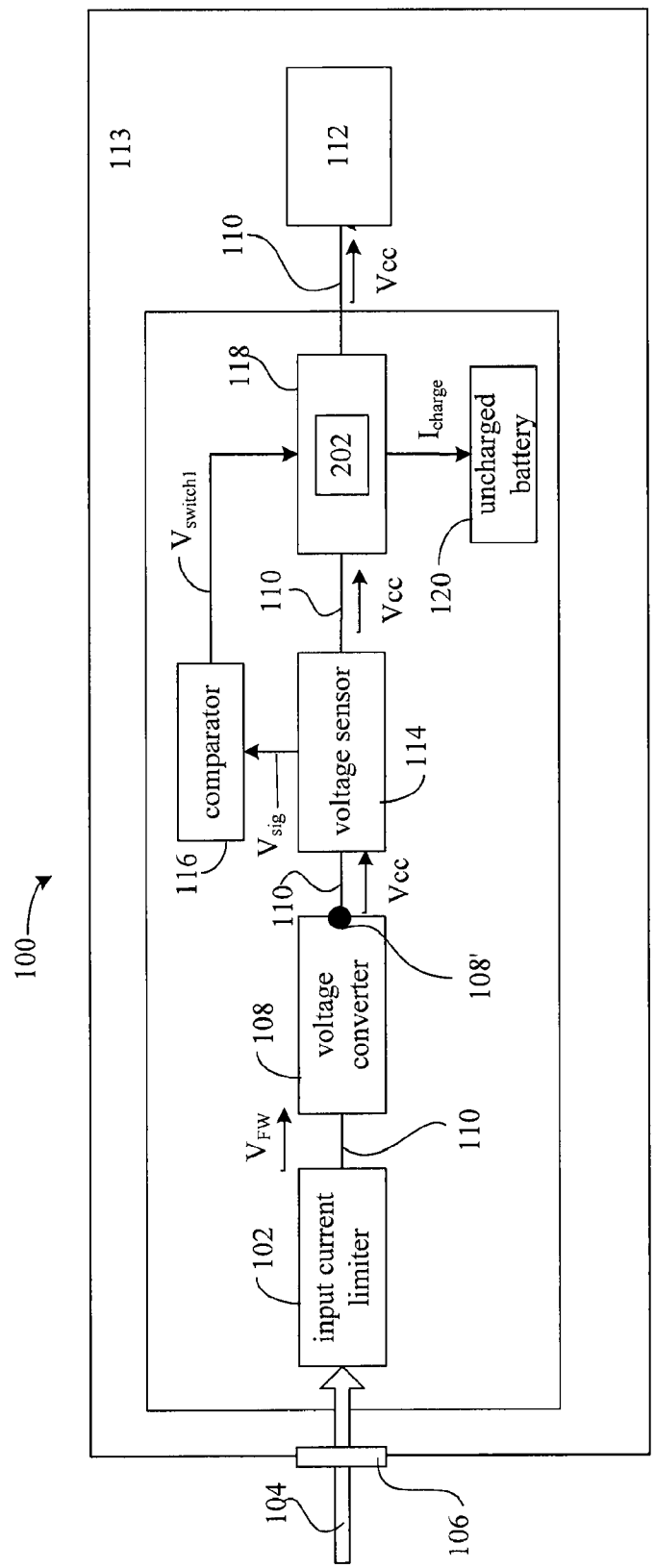
FIG. 2 shows a switchover circuit of the invention.

Referring to FIG. 2, the switchover circuit 118 includes a comparator 202 that helps to ensure a smooth transition from battery to FireWire power and vice versa. The switch over circuit 118 ensures that the voltage on the main supply bus 110 (VCC_MAIN) doesn't drop below a pre-determined minimum voltage Vmin (at which point a reset signal is typically provided). Accordingly, the FireWire voltage converter 108 switches in/out when the voltage on the main bus 110 (Vcc_main) has risen/dropped above/below Vmin.

The switch over control circuitry is a very vital part of the system because it ensures a smooth transition from battery to fire wire power and the other way around. The switch over circuit ensures that the voltage on the main supply bus (net VCC_MAIN) doesn't drop below a minimum voltage, at which the reset circuit generates a reset.

The minimum VCC_MAIN voltage can be calculated as follows:

$$V_{VCC\_MAIN,MIN} = V_{TH,RESET,MAX} + (R_{DS,Q5,MAX} + R_{L20,MAX}) * I_{VCC3,MAX} \quad \text{(equ. 2.1.4a)}$$

With the values inserted we obtain:

$$V_{VCC\_MAIN,MIN} = 3.135V + (0.05 + 0.150)\Omega * 0.5A = 3.235V$$

For this voltage, the buck regulator U17 behaves as a linear low drop out regulator and PFET Q5 is closed all the time.

The fire wire buck converter is going to be switched in/out when the voltage on net VCC_MAIN has risen/dropped above/below VVCC_MAIN,MIN. For this, the forward voltage drop VFW,D7 of isolation diode D7 has to be taken into account:

$$V_{TH,SWITCHOVER} = V_{CC\_MAIN,MIN} + V_{FW,MAX,D7}$$

$$3.235V + 0.55 = 3.785V \quad \text{(equ. 2.1.4b)}$$

U18's comparator threshold is calculated as follows:

$$V_{TH,SWITCHOVER} = \left(\frac{R_{116} + R_{119}}{R_{116}}\right) \cdot V_{REF,U18} \quad \text{(equ. 2.1.4c)}$$

The minimum threshold is:

$$V_{TH,MIN,SWITCHOVER} = \quad \text{(equ. 2.1.4d)}$$
$$\left(\frac{(R_{116} + 1\%) + (R_{119} - 1\%)}{(R_{116} + 1\%)}\right) \cdot (V_{REF,U18} - 2\%)$$

with R116=340K, R119=806K, $V_{REF,U18}$=1.182V inserted in equ. 2.1.4d we get:

$$V_{TH,MIN,SWITCHOVER} = 3.85V < 3.785 \text{ (see equ. 2.1.4b)} \rightarrow OK!$$

Figure 3:
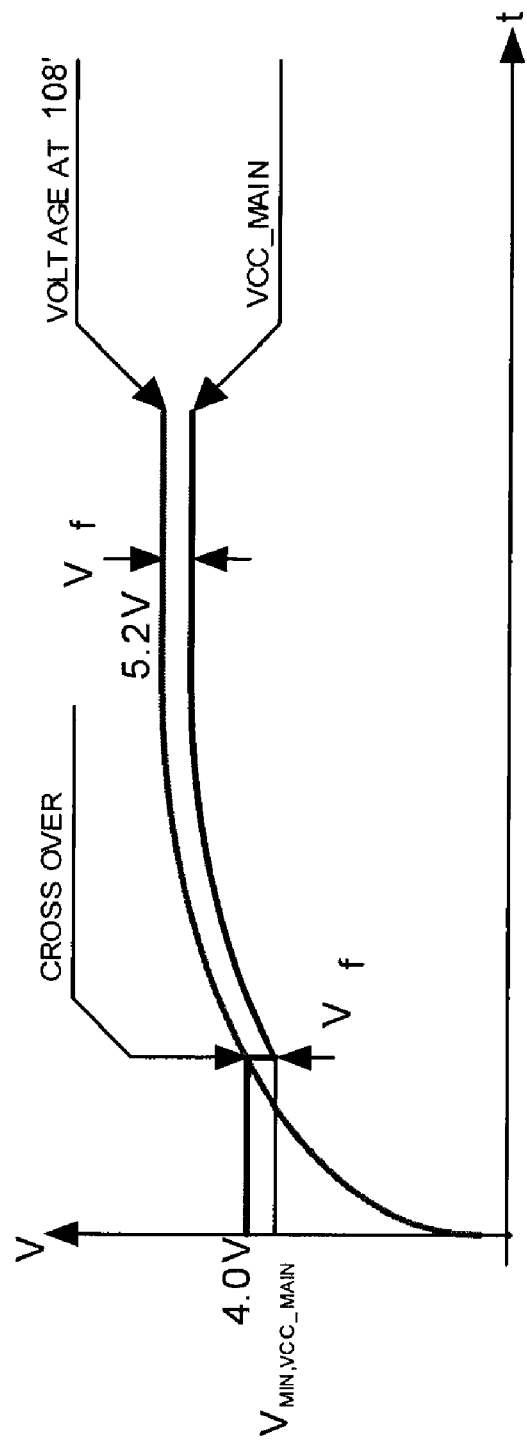
FIG. 3 shows an exemplary response waveforms for the switchover state where the battery is fully charged.

FIG. 3 shows an exemplary response waveforms for the switchover state where the battery is full and the FireWire is plugged in. After the FireWire cable 104 is plugged into the port 106, the output of the FireWire voltage converter 108 reaches its destination voltage within 15 ms. When the output of the FireWire voltage converter 108 reaches the switch over threshold Vswitch, the comparator 202 disconnects battery power from the main supply bus 110. For a short period of time, neither the battery 120 nor the FireWire voltage converter 108 supply power to VCC_MAIN 110 and the voltage on VCC_MAIN 110 will drop until either of the voltage sensor 114 starts conducting such that the voltage cannot drop below the voltage VMIN. Eventually the voltage sensor 114 starts conducting, pulling the voltage on bus 110 up to a pre-set voltage drop Vf below the destination output voltage of the FireWire voltage converter 108.

Figure 4:
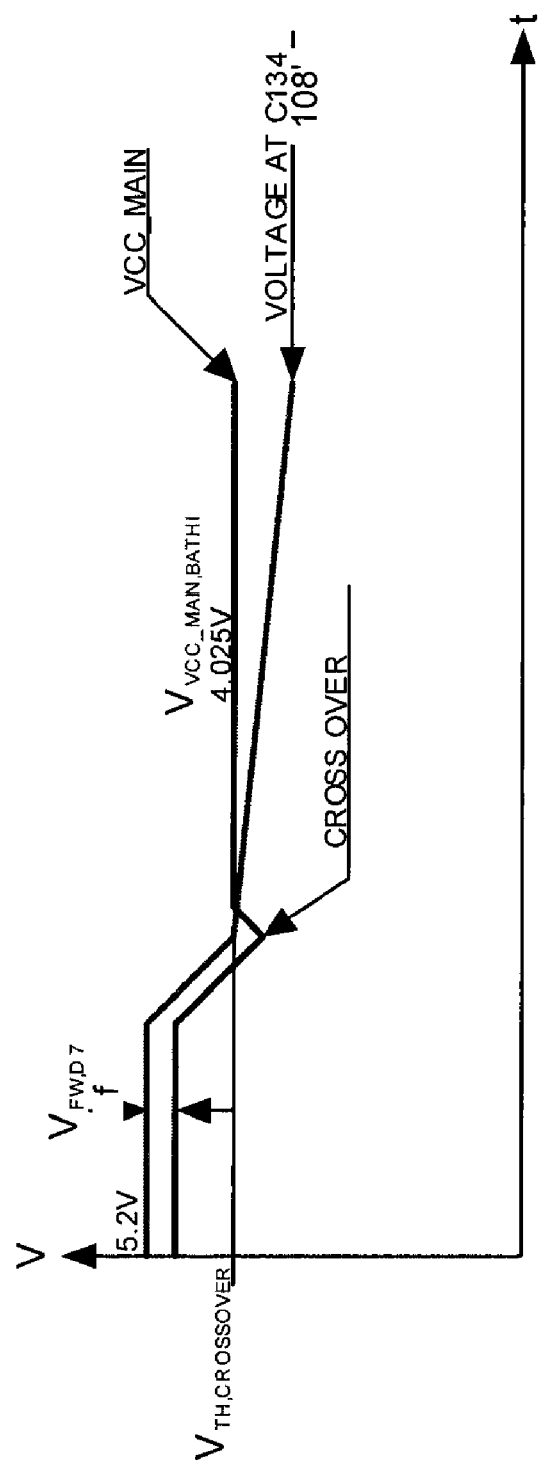
FIGS. 4 and 5 show an exemplary response waveforms for the switchover state where the battery is full and the FireWire is unplugged in two separate scenarios.
Figure 5:
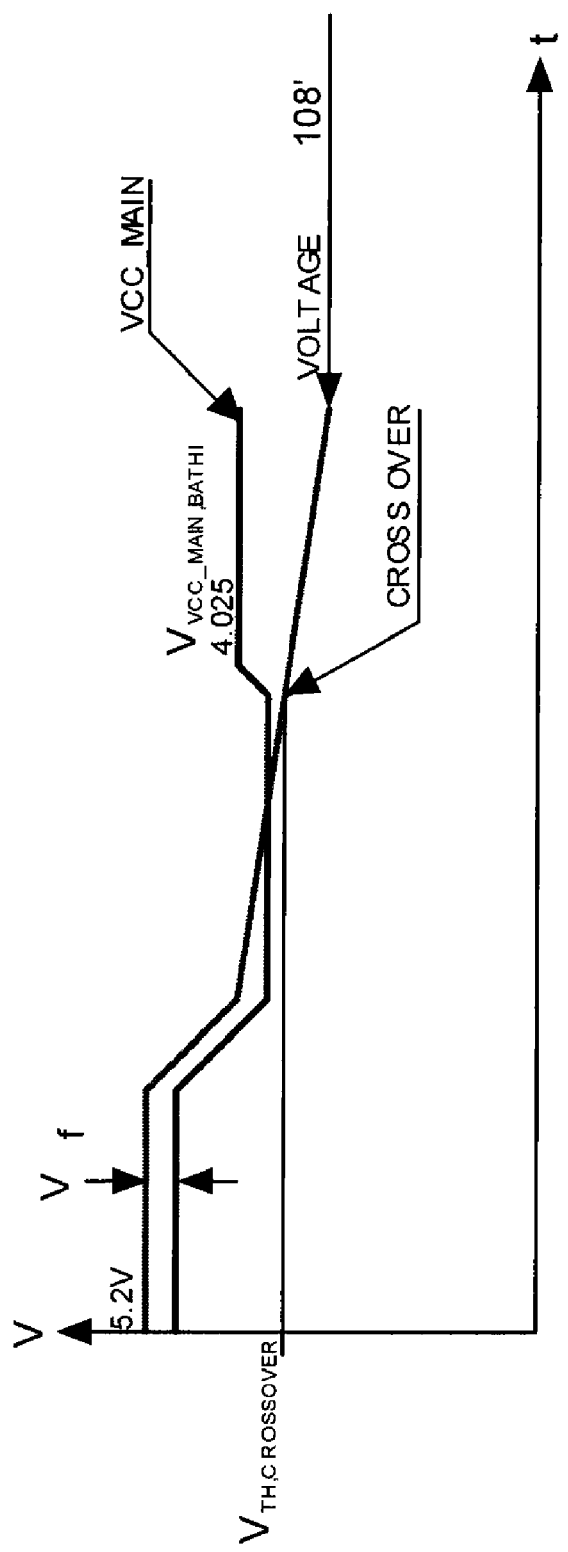

FIGS. 4 and 5 show an exemplary response waveforms for the switchover state where the battery is full and the FireWire is unplugged in two separate scenarios. Initially, the voltage VVCC_MAIN is Vf below the voltage of the FireWire voltage converter 108. Due to the system load, the output voltage of the FireWire voltage converter 108 is going to drop rapidly as the voltage sensor 114 discharges into the main supply bus 110. When FireWire 106 is unplugged the voltage at the output of the FireWire voltage converter 108 is going to drop rapidly until the voltage sensor 114 starts conducting. At this point the voltage at the output of the FireWire voltage converter 108 may or may not have not dropped below the switch over threshold Vswitch. There will be two possible scenarios:

In one scenario shown in FIG. 4, the comparator threshold has been crossed in which case, the battery 120 has to make up for the voltage Vf. In a second scenario shown in FIG. 5, the comparator threshold has not been crossed.

Figure 6:
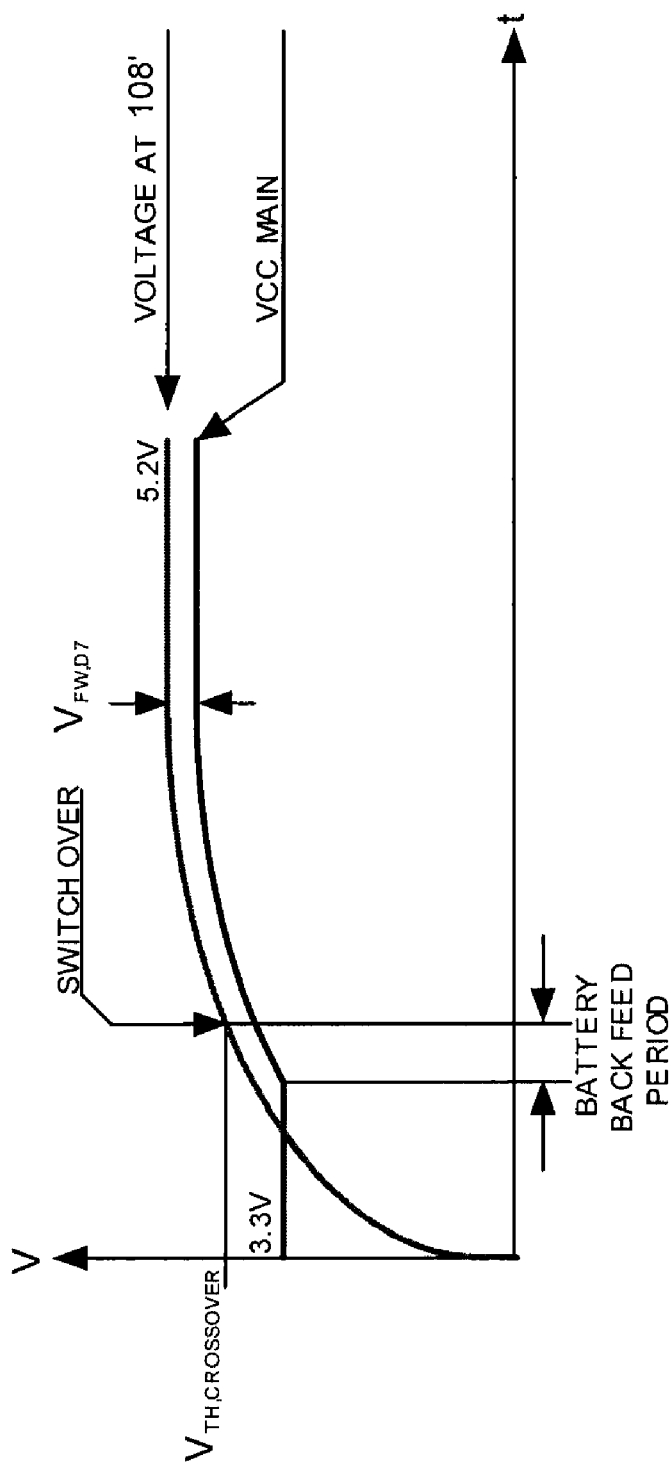
FIG. 6 shows an exemplary response waveforms for the switchover state where the battery is low and the FireWire is plugged.

FIG. 6 shows an exemplary response waveforms for the switchover state where the battery is low and the FireWire is plugged. In the described embodiment, the battery is considered empty when its voltage drops below 3.45V. For the purpose of this discussion only therefore, the battery voltage is considered to be at 3.3V. If the battery voltage drops below 3.45V the system is turned off and less than 2 mA are drawn from the battery. Therefore the voltage the main bus 110 is approximately equal to the battery voltage VBAT=3.3V. After the FireWire connector 104 is plugged into the port 106, output 108' increases. If output 108' increases above VVCC_MAIN of 3.3V, the voltage sensor 114 starts conducting. The battery will be back fed from then on, until output 108' reaches the switch over threshold.

Figure 7:
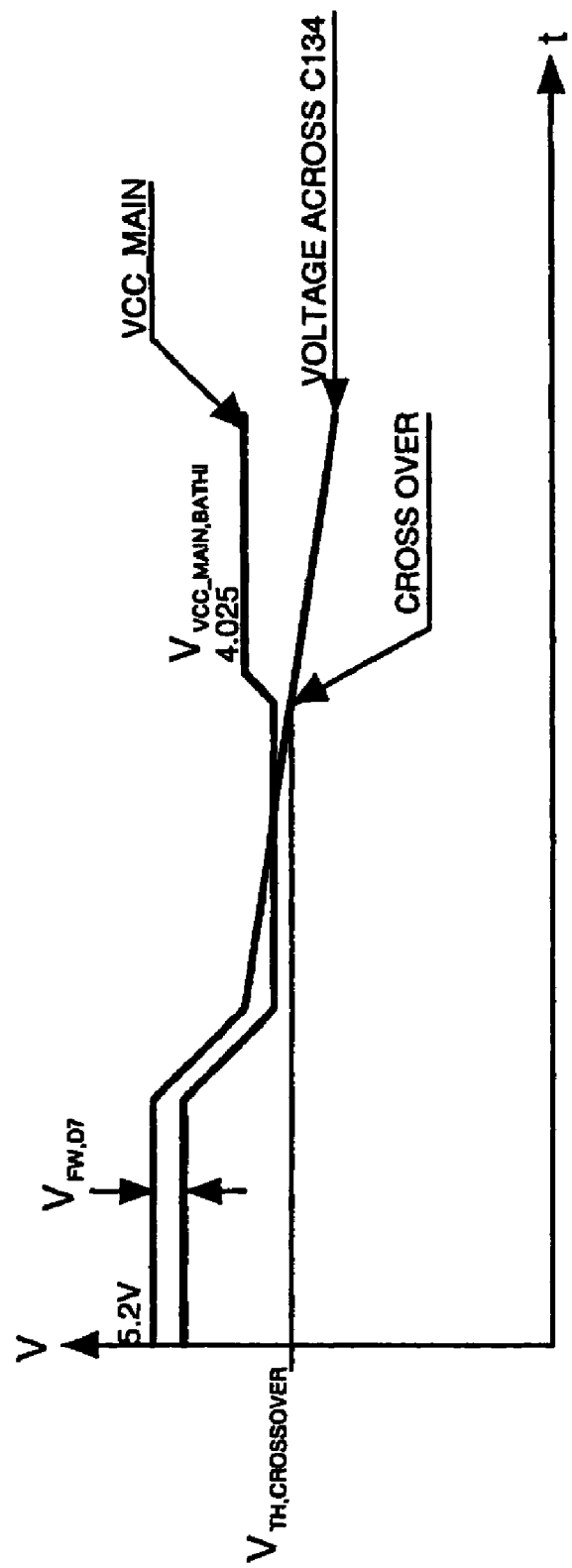
FIG. 7 shows an exemplary response waveforms for the switchover state where the battery is low and the FireWire is unplugged.

FIG. 7 shows an exemplary response waveforms for the switchover state where the battery is low and the FireWire is unplugged. Initially, the voltage VVCC_MAIN on the main bus 110 is Vf below the voltage of the FireWire voltage converter 108 resulting in the output 108' dropping off rapidly. When output 108' drops below the switch over threshold Vswitch, voltage converter 108 is going to back feed into the battery until output 108' drops below a level where voltage sensor 114 loses conduction. If the latter occurs, output 108' is going to be discharged much slower as it is disconnected from the rest of the system. It has to be noted that this particular scenario is very rare as the battery voltage recovers within short periods of time to a level that is above the 3.45V system shut down threshold.

Figure 8:
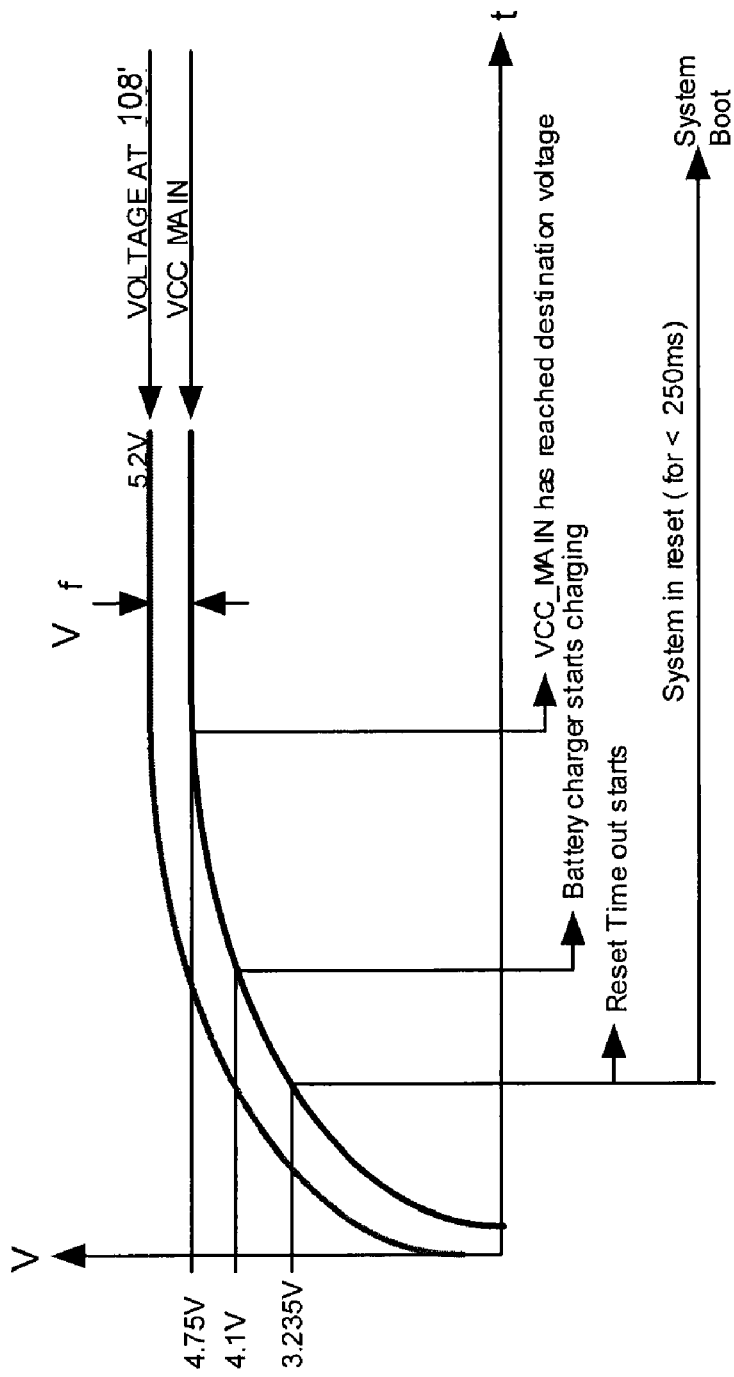
FIG. 8 shows an exemplary response waveforms for the switchover state where the battery is empty and the FireWire is plugged.

FIG. 8 shows an exemplary response waveforms for the switchover state where the battery is empty and the FireWire is plugged. When the battery is empty, VVCC_MAIN is initially approximately ground level and the battery charger circuit is disabled. If output 108' charges up, VVCC_MAIN is approximately one diode forward voltage drop below output 108'. (It should be noted that a reset circuit keeps the system 100 in constant reset below voltages of 3.135V) thereby enabling a battery charger circuit. If battery charger circuit supply voltage has exceeded the lockout voltage of 4.1V, battery back feeding is prevented because the battery 120 is disconnected from the system 100. The battery charger is activated when its supply voltage exceeds the under voltage lock out threshold of 4.1V. To enable the battery charger, the voltage at the output of the FireWire voltage converter 108 must be one forward diode drop above the lock out voltage of the battery charger. Therefore, output 108' has to rise above approximately 4.6V to activate the charger.

Figure 9:
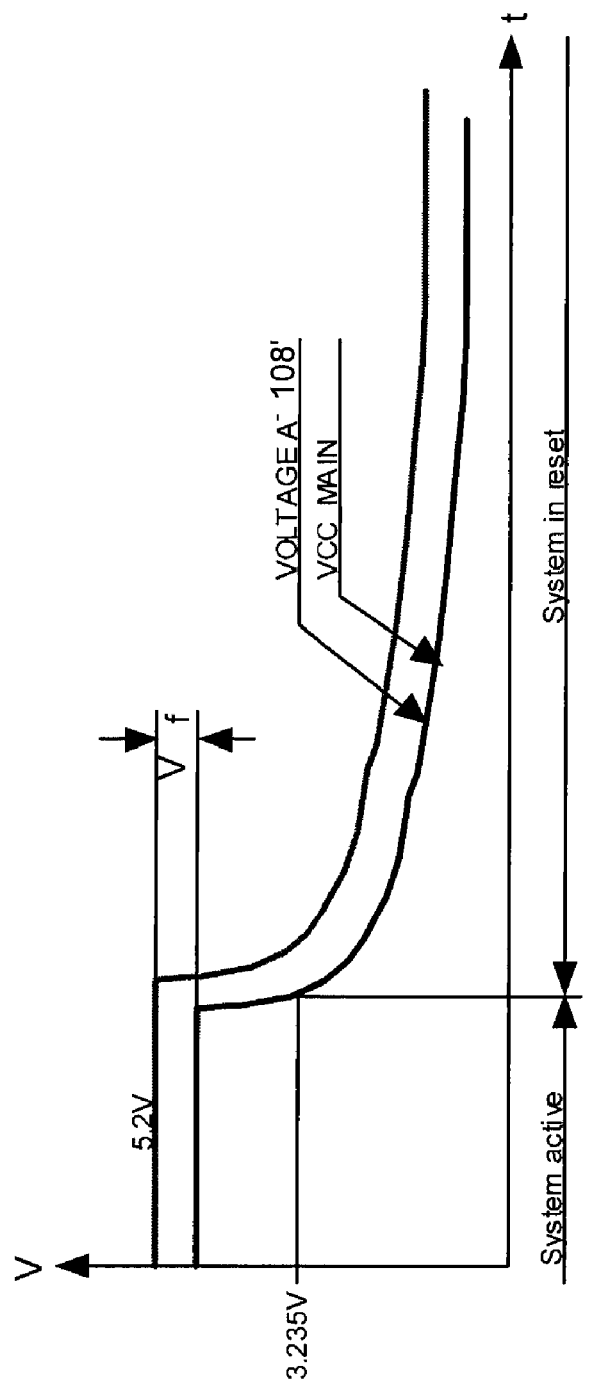
FIG. 9 shows an exemplary response waveforms for the switchover state where the battery is empty and the FireWire is unplugged.

FIG. 9 shows an exemplary response waveforms for the switchover state where the battery is empty and the FireWire is unplugged. When the battery is empty and FireWire 104 is unplugged, the system 100 will run until VCC_MAIN drops rapidly below reset threshold voltage Vreset,TH. In reset, the battery disconnect circuitry disconnects the battery from the system 100 when the battery voltage drops below 3.1V to avoid deep discharge of the battery using a low voltage disconnect circuitry.

Although only a few embodiments of the present invention have been described, it should be understood that the present invention may be embodied in many other specific forms without departing from the spirit or the scope of the present invention. Therefore, the present examples are to be considered as illustrative and not restrictive, and the invention is not to be limited to the details given herein, but may be modified within the scope of the appended claims along with their full scope of equivalents.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. A power manager unit for managing power delivered to a battery powered device, comprising:
   a main bus;
   an inrush current limiter, wherein the inrush current limiter limits current from a power line connected to the inrush current limiter;
   a voltage converter unit connected to the main bus and to the output of the inrush current limiter;
   a voltage sensor unit coupled to the main bus and arranged to sense a voltage on the main bus; and
   a switchover circuit arranged to, upon connection of a power line to the inrush current limiter-causing the voltage sensor unit to sense a voltage on the main bus above a predefined threshold, connect the voltage converter unit to the battery powered device, and upon detection that the battery is in a fully charged state, disconnect the battery from the voltage converter unit such that no current flows to or from the battery, wherein the switchover circuit is further arranged to, upon disconnection of a power line from the voltage converter causing the voltage sensor unit to sense a voltage on the main bus below the predefined threshold, disconnect the voltage converter unit from the battery powered device and connect a battery to the battery powered device.

2. A power manager unit for managing power delivered to a battery powered device, comprising:
   a main bus;
   an inrush current limiter, wherein the inrush current limiter limits current from a power line connected to the inrush current limiter;
   a voltage converter unit connected to the main bus and to the output of the inrush current limiter, wherein the voltage converter unit has a soft start capability such that an output voltage/current limit is slowly increased until reaching a set limit, preventing a voltage spike on the main bus when a power line is connected to the inrush current limiter;
   a voltage sensor unit coupled to the main bus and arranged to sense a voltage on the main bus; and
   a switchover circuit arranged to, upon connection of a power line to the inrush current limiter-causing the voltage sensor unit to sense a voltage on the main bus above a predefined threshold, connect the voltage converter unit to the battery powered device, and upon detection that the battery is in a fully charged state, disconnect the battery from the voltage converter unit such that no current flows to or from the battery.

3. A method of managing power delivered to a battery powered device, comprising:
   receiving an external voltage through a data port in the device;
   converting the external voltage from the data port to a supply voltage on a main bus using a voltage converter unit;
   sensing a voltage on the main bus higher than a predetermined threshold, wherein the voltage converter unit includes an isolation diode having a forward voltage drop, and wherein the predetermined threshold is based on the forward voltage drop;
   generating a switching signal based upon the sensed voltage when the sensed voltage is greater than the predetermined threshold; and
   upon detection of the switching signal and upon detection that the battery is in a fully charged state, disconnecting the battery from the voltage converter unit such that no current flows to or from the battery.

4. The method of claim 3, wherein the external voltage is delivered by way of a cable that includes a number of lines at least one of which is a power line arranged to carry the external voltage from the external voltage supply to the battery powered device.

5. A system comprising:
   a battery powered device having a central processing unit (CPU);
   a power manager unit for managing power delivered to a battery powered device, comprising:
   an inrush current limiter arranged to receive power from a power line connected to the power manager unit and limit current output of the inrush current limiter;
   a buck converter connected to the output of the inrush current limiter and arranged to convert a voltage from the output of the inrush current limiter to a different voltage on a main bus;
   a voltage sensor unit coupled to the main bus and arranged to sense a voltage on the main bus;
   a comparator unit coupled to the voltage sensor unit arranged to generate a first switching signal when the voltage sensor unit detects a voltage on the main bus above a first predefined threshold, wherein the first predefined threshold is based on the forward voltage drop wherein the comparator unit is further arranged to generate a reset signal when the power line is disconnected from the main bus and the voltage sensor unit detects a voltage on the main bus less than the second predefined threshold; and
   a switchover circuit coupled to the comparator unit arranged to respond to the first switching signal by concurrently disconnecting the voltage converter unit from the battery such that no current flows to or from the battery if the battery is in a fully charged state wherein the switchover circuit is arranged to respond to the reset signal by disconnecting the battery from the battery powered device to avoid deep discharge of the battery; and
   wherein the CPU is configured to respond to the reset signal by entering a sleep state.

6. The system of claim 5, wherein an output voltage rise time for the buck converter is less than 15 ms.

7. The system of claim 5, wherein the power on the power line is delivered by way of a cable that includes a number of lines at least one of which is a power line arranged to carry the external voltage from the external voltage supply to the battery powered device.

8. The system of claim 5, wherein the buck converter has an isolation diode with a forward voltage drop and wherein the predefined threshold includes a correction based on the forward voltage drop of the isolation diode.

9. A portable consumer electronic product having at least a battery and an active circuit coupled to the battery, comprising:
   a sensor unit arranged to detect if the battery is in a low-charged state and whether data is transmitted over a cable connected to an electrical supply, wherein the presence of the data indicates that the cable is connected to the device;
   a switchover circuit arranged to, in response to the detection of data on the cable connected to the electrical supply, wherein the switchover circuit is further arranged to, upon disconnection of a power line from the sensor unit causing the sensor unit to sense a voltage on a main bus below the predefined threshold, disconnect the sensor unit from the battery;
   when the active circuit is operational and the battery is not in either a low-charged or a substantially fully-charged state, then provide electrical power from both the electrical supply and the battery to the operational active circuit;
   when the active circuit is operational and the battery is in the low-charged state, then provide electrical power only from the electrical supply to the operational active circuit; and
   when the active circuit is operational and the battery is substantially fully charged then disconnect the battery from the electrical supply and providing electrical power only from the battery to the operational active circuit.

10. The portable consumer electronic product of claim 9, wherein the cable includes two twisted pairs of wires carrying data.

11. The portable consumer electronic product of claim 10, wherein the two twisted pairs of wires are separately shielded.

12. The portable consumer electronic product of claim 11, wherein the cable is an I.E.E.E. 1394 compliant cable.

13. The portable consumer electronic product of claim 9, wherein the switchover circuit is further arranged to:
   when the active circuit is operational and the battery is in a low-charged state, then draw electrical power from the electrical supply to both the battery and the operational active circuit, wherein the electrical power drawn from the electrical supply to the operational active circuit is at a first current; and
   when the active circuit is operational and the battery is not in either a low-charged or a substantially fully-charged state, then draw electrical power from the electrical supply to both the battery and the operational active circuit, wherein the electrical power drawn from the electrical supply to the operational active circuit is at a second current that is different from the first current.

14. The power manager unit of claim 2, wherein the soft start capability is implemented using an external pull-up resistor and a soft start capacitor.

15. The power manager unit of claim 14, wherein the electrical power on the power line is delivered by way of a cable that includes a number of lines at least one of which is a power line arranged to carry the external voltage from the external voltage supply to the battery powered device.

16. The power manager unit of claim 15, wherein the cable includes two twisted pairs of wires carrying data.

17. Power manager unit of claim 1, wherein the electrical power on the power line is delivered by way of a cable that includes a number of lines at least one of which is a power line arranged to carry the external voltage from the external voltage supply to the battery powered device.

18. The power manager unit of claim 17, wherein the cable includes two twisted pairs of wires carrying data.

\* \* \* \* \*

UNITED STATES PATENT AND TRADEMARK OFFICE
CERTIFICATE OF CORRECTION

PATENT NO. : 7,940,026 B2
APPLICATION NO. : 12/634601
DATED : May 10, 2011
INVENTOR(S) : Anthony M. Fadell et al.

Page 1 of 1

It is certified that error appears in the above-identified patent and that said Letters Patent is hereby corrected as shown below:

In column 1, line 61, delete "IEE1394" and insert -- IEEE1394 --, therefor.

In column 5, line 26, delete "account :" and insert -- account: --, therefor.

In column 5, line 28, delete "$V_{CC\_MAIN,MIN}+V_{FW,MAX,D7}$" and insert -- $V_{VCC\_MAIN,MIN}+V_{FW,MAX,D7}$ --, therefor.

In column 10, line 23, in claim 15, delete "claim 14," and insert -- claim 2, --, therefor.

In column 10, line 30, in claim 17, delete "Power" and insert -- The power --, therefor.

Signed and Sealed this
Sixth Day of December, 2011

David J. Kappos
*Director of the United States Patent and Trademark Office*